(12) United States Patent
Seki et al.

(10) Patent No.: US 10,275,661 B2
(45) Date of Patent: Apr. 30, 2019

(54) IMAGE PROCESSING APPARATUS, IMAGE PROCESSING METHOD, AND COMPUTER PROGRAM PRODUCT

(71) Applicant: Kabushiki Kaisha Toshiba, Tokyo (JP)

(72) Inventors: Akihito Seki, Yokohama (JP); Takaaki Kuratate, Kawasaki (JP); Norihiro Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 252 days.

(21) Appl. No.: 15/156,468

(22) Filed: May 17, 2016

(65) Prior Publication Data
US 2016/0342848 A1 Nov. 24, 2016

(30) Foreign Application Priority Data
May 20, 2015 (JP) .................................. 2015-103251

(51) Int. Cl.
*G06K 9/00* (2006.01)
*G01M 5/00* (2006.01)
(Continued)

(52) U.S. Cl.
CPC ....... *G06K 9/00791* (2013.01); *G01M 5/0033* (2013.01); *G06K 9/4661* (2013.01);
(Continued)

(58) Field of Classification Search
CPC ............. G06K 9/00791; G06K 9/4661; G06K 2009/4666; G06K 2009/2045; G06T 7/73;
(Continued)

(56) References Cited

U.S. PATENT DOCUMENTS 6,456,731 B1 * 9/2002 Chiba .................. G06T 7/33
382/107
8,922,662 B1 * 12/2014 Fu ..................... H04N 5/23264
348/208.12
(Continued)

FOREIGN PATENT DOCUMENTS

JP    H9-96515 A    4/1997
JP    2008-46065    2/2008
(Continued)

OTHER PUBLICATIONS

"Manual pavement investigation and testing methods", s029, published by Japan Road Association, 8 pages (2007).
(Continued)

*Primary Examiner* — Carol Wang
(74) *Attorney, Agent, or Firm* — Finnegan, Henderson, Farabow, Garrett & Dunner, L.L.P.

(57) ABSTRACT

According to an embodiment, an image processing apparatus includes an acquirer, a setter, a selector, a generator, and an outputter. The acquirer acquires taken images of a target surface imaged by an imaging device in time series while the imaging device is moved by a moving object. The setter sets an inspection range composed of inspection areas on the target surface. The selector selects, for each inspection area, the taken image used for generating an inspection area image out of the taken images. The generator extracts, for each inspection area, from the selected taken image, a partial image corresponding to the inspection area; transforms each partial image into a transformed partial image in a coordinate system of the target surface; and composes transformed partial images on the basis of an arrangement of the inspection areas to generate the inspection area image. The outputter outputs the inspection area image.

8 Claims, 17 Drawing Sheets

(51) Int. Cl.
  *G06T 3/00* (2006.01)
  *G06K 9/46* (2006.01)
  *G06T 7/00* (2017.01)
  *H04N 5/357* (2011.01)
  *G06K 9/62* (2006.01)

(52) U.S. Cl.
  CPC .............. *G06T 3/00* (2013.01); *G06T 7/0004* (2013.01); *H04N 5/3572* (2013.01); *G06K 9/4604* (2013.01); *G06K 9/4647* (2013.01); *G06K 9/6269* (2013.01); *G06K 9/6271* (2013.01); *G06K 2009/4666* (2013.01); *G06T 2207/10016* (2013.01); *G06T 2207/30108* (2013.01); *G06T 2207/30168* (2013.01); *G06T 2207/30252* (2013.01)

(58) Field of Classification Search
  CPC ............... G06T 7/0004; G06T 3/00; G06T 2207/30252; G06T 2207/30108; G06T 2207/30168; G06T 3/4038; G06T 2207/30248; G01M 5/0033
  See application file for complete search history.

(56) References Cited

U.S. PATENT DOCUMENTS

| | | | | |
|---|---|---|---|---|
| 9,659,224 | B1* | 5/2017 | Cole | ............... G06K 9/18 |
| 2008/0181488 | A1* | 7/2008 | Ishii | ............... B60R 1/00 |
| | | | | 382/154 |
| 2009/0245653 | A1* | 10/2009 | Kochi | ............... G06T 3/4038 |
| | | | | 382/203 |
| 2011/0314049 | A1* | 12/2011 | Poirier | ............... H04N 1/00183 |
| | | | | 707/769 |
| 2012/0257009 | A1* | 10/2012 | Lee | ............... H04N 5/232 |
| | | | | 348/36 |
| 2016/0125612 | A1 | 5/2016 | Seki et al. | |
| 2016/0133007 | A1 | 5/2016 | Kuratate et al. | |
| 2016/0133008 | A1 | 5/2016 | Kuratate et al. | |
| 2016/0286137 | A1* | 9/2016 | Marks | ............... G06T 3/4038 |

FOREIGN PATENT DOCUMENTS

| | | |
|---|---|---|
| JP | 2015-11665 A | 1/2016 |
| JP | 2016-90333 | 5/2016 |
| JP | 2016-90547 | 5/2016 |
| JP | 2016-90548 | 5/2016 |
| WO | WO 2008/130233 A1 | 10/2008 |
| WO | WO 2009/064172 A1 | 5/2009 |
| WO | WO 2011/047731 A1 | 4/2011 |

OTHER PUBLICATIONS

Koch, Christian et al.: "A review on computer vision based defect detection and condition assessment of concrete and asphalt civil infrastructure." *Advanced Engineering Informatics*; 29 (2015); 196-210.

* cited by examiner

IMAGE PROCESSING APPARATUS, IMAGE PROCESSING METHOD, AND COMPUTER PROGRAM PRODUCT

CROSS-REFERENCE TO RELATED APPLICATIONS

This application is based upon and claims the benefit of priority from Japanese Patent Application No. 2015-103251, filed on May 20, 2015; the entire contents of which are incorporated herein by reference.

FIELD

Embodiments described herein relate generally to an image processing apparatus, an image processing method, and a computer program product.

BACKGROUND

Techniques have been known that determine road surface conditions from crack percentages of the road surfaces for maintenance and management of the road surfaces. In such techniques, a plurality of inspection areas each having a certain size (e.g., 50 cm×50 cm) are set on a road surface and the crack percentage is calculated for each inspection area from the number of cracks in the inspection area. A higher crack percentage indicates the road surface that has been further deteriorated.

JP-A 2008-46065 (KOKAI) discloses, for example, the following technique: for causing an inspector to know cracks on a road surface, a line camera or an area camera is put in a measuring vehicle such that the camera looks down the road surface, lighting is put in the measuring vehicle such that the lighting illuminates an imaging position of the line camera or the area camera, the illuminated imaging position is imaged by the line camera or the area camera while the measuring vehicle runs on the road, and an image of the road surface viewed from directly above the road surface is generated by composing the taken images.

The conventional technique, however, causes a difference in brightness between the taken images due to various factors such as brightness of the road surface and uneven brightness in the image. In the composed image obtained by composing the taken images, brightness changes at the border between the taken images in the composed image. As a result, the existence of such a border in the inspection area may cause the border to be erroneously recognized as abnormality.

DETAILED DESCRIPTION

According to an embodiment, an image processing apparatus includes an acquirer, a setter, a selector, a generator, and an outputter. The acquirer acquires a plurality of taken images of a target surface imaged by an imaging device in time series while the imaging device is moved by a moving object. The setter sets an inspection range composed of a plurality of inspection areas on the target surface. The selector selects, for each of the inspection areas, the taken image used for generating an inspection area image out of the taken images. The generator extracts, for each of the inspection areas, from the selected taken image, a partial image corresponding to the inspection area on the basis of a position of the imaging device at a time of taking the image in a coordinate system of the target surface and on the basis of a corresponding relation between a coordinate system of the imaging device and the coordinate system of the target surface; transforms each of the partial images into a transformed partial image in the coordinate system of the target surface on the basis of the corresponding relation; and composes a plurality of transformed partial images on the basis of an arrangement of the inspection areas to generate the inspection area image. The outputter configured to output the inspection area image.

The following describes embodiments in detail with reference to the accompanying drawings.

First Embodiment

Figure 1:
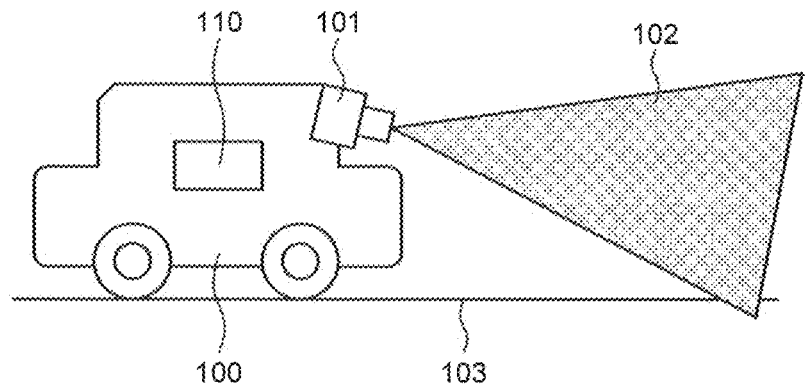
FIG. 1 is a schematic diagram illustrating an example of a structure of a moving object in a first embodiment.

FIG. 1 is a schematic diagram illustrating an example of a structure of a moving object 100 used for imaging a target surface 103 in a first embodiment. In the first embodiment, the target surface 103 is a road pavement surface and the moving object 100 is a vehicle. The target surface 103 and the moving object 100 are, however, not limited to those examples.

The moving object 100 is provided with an imaging device 101 that images a target surface in an imaging range 102, such as a camera, and an image processing apparatus 110. However, it is not essential that the image processing apparatus 110 is put in the moving object 100. The image processing apparatus 110 may be put in any place where the image taken by the imaging device 101 can be acquired.

The moving object 100 moves on the target surface 103. The imaging device 101 images the target surface in the imaging range 102 in time series during the movement of the moving object 100, and inputs the taken images into the image processing apparatus 110.

The imaging device 101 also inputs internal camera parameters into the image processing apparatus 110. A relation between a position on the taken image and a three-dimensional position in an actual space is represented by expression (1) using the internal camera parameters.

$$\tilde{x} \sim P\tilde{X} = A \begin{pmatrix} 1 & 0 & 0 & 0 \\ 0 & 1 & 0 & 0 \\ 0 & 0 & 1 & 0 \end{pmatrix} \tilde{X} \quad (1)$$

where $\tilde{x}$ represents the position on the taken image in a homogeneous coordinate system and $\tilde{x}=(u,v,1)$, $\tilde{X}$ represents the three-dimensional position in the actual space in a homogeneous coordinate system and $\tilde{X}=(X,Y,Z,1)$, P is a perspective projection matrix, and A represents the internal camera parameters, which is represented by expression (2)

$$A = \begin{pmatrix} fx & 0 & cx \\ 0 & fy & cy \\ 0 & 0 & 1 \end{pmatrix} \quad (2)$$

where fx represents a value obtained by dividing a focal length in the horizontal direction of the taken image by an effective pixel spacing of the taken image, fy represents a value obtained by dividing a focal length in the vertical direction of the taken image by the effective pixel spacing of the taken image, and ex and cy represent the optical center position of the taken image.

When a lens of the imaging device 101 has distortion, the imaging device 101 also inputs distortion parameters into the image processing apparatus 110. The distortion parameters may be set taking into account tangential distortion, radial distortion, distortion in a fisheye lens or an omnidirectional lens.

Figure 2:
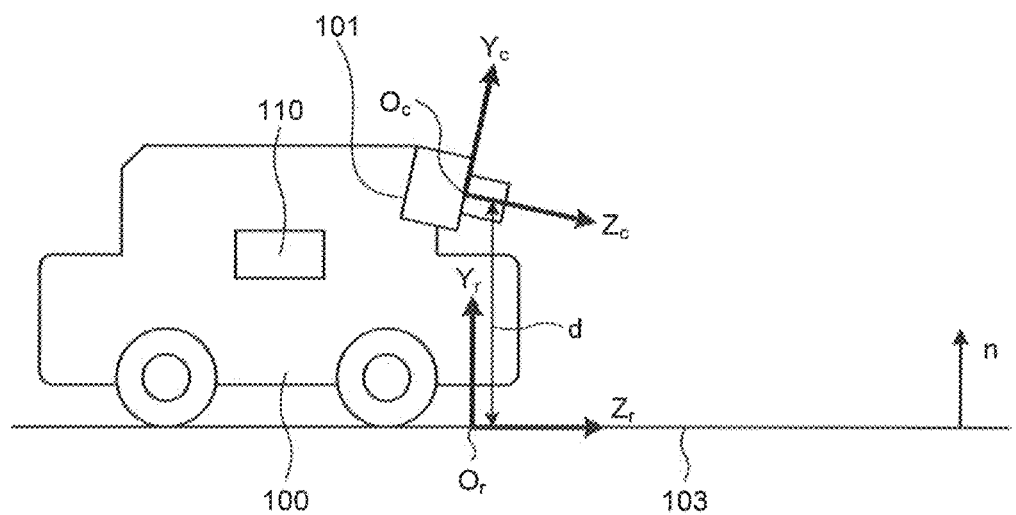
FIG. 2 is a schematic diagram illustrating an example of a coordinate system in the first embodiment.

Examples of external parameters of the imaging device 101 include a normal vector n=(nx, ny, nz) of the target surface 103 and a distance d between the target surface 103 and the optical center of the imaging device 101, as illustrated in FIG. 2. The examples further include a relative posture (a rotation matrix and a translation vector) of the imaging device 101.

The positional relation between the imaging device 101 and the target surface 103, i.e., a relation between a coordinate system (in FIG. 2, represented with $Y_c$ and $Z_c$) of the imaging device 101 and a coordinate system (in FIG. 2, represented with $Y_r$ and $Z_r$) of the target surface 103 is represented by expression (3).

$$X_r = R^{-1}X_c + t \quad (3)$$

where $X_r$ represents the coordinates of the target surface 103 and $X_c$ represents the coordinates of the imaging device 101, t=(0 0 d), and R is represented by expression (4).

$$R = \begin{pmatrix} \cos\theta\cos\phi\cos\psi - \sin\phi\sin\psi & \cos\theta\sin\phi\cos\psi + \cos\phi\sin\psi & -\sin\theta\cos\psi \\ -\cos\theta\cos\phi\sin\psi - \sin\theta\cos\psi & -\cos\theta\sin\phi\sin\psi + \cos\phi\cos\psi & \sin\theta\sin\psi \\ \sin\theta\cos\psi & \sin\theta\sin\phi & \cos\theta \end{pmatrix} \quad (4)$$

where $\theta$=arcos(nz), $\psi$=arctan(-ny/nx), and $\phi=\pm\pi/2$.

The positional relation between the imaging device 101 and the target surface 103 is changed by vibrations due to the movement of the moving object 100 and the road conditions in some cases. The image processing apparatus 110, thus, may estimate the positional relation between the imaging device 101 and the target surface 103 every time an image is taken.

Using the relative posture (a rotation matrix $R_{r,m,m+1}$ and a translation vector $t_{r,m,m+1}$) between time m and time (m+1), the relation between a position $X_{r,m+1}$ of the imaging device 101 in the coordinate system of the target surface 103 at time (m+1) and a position $X_{r,m}$ of the imaging device 101 in the coordinate system of the target surface 103 at time m is represented by expression (5).

$$X_{r,m+1} = R_{r,m,m+1}X_{r,m} + t_{r,m,m+1} \quad (5)$$

The rotation matrix and the translation vector can be estimated by the image processing apparatus 110 using radio waves, for example. In this case, the geographical coordinates may be obtained using a global navigation satellite system (GNSS) such as a global positioning system (GPS) or a global navigation satellite system (GLONASS), a quasi-zenith satellite Michibiki, or radio waves from a WiFi base station. An azimuth is necessary for finding the relative rotation matrix every time an image is taken. A reference azimuth (which is not always the north or the south) may be obtained from a plurality of geographical coordinates using a magnetic sensor or a plurality of global navigation satellite systems put in the moving object 100, or an output value of an angular velocity sensor or an acceleration sensor put in the moving object 100.

The rotation matrix and the translation vector can be estimated by the image processing apparatus 110 using a distance meter, for example. In this case, the moving distance of the moving object 100 may be obtained by reading a rotation amount of a wheel, which serves as a distance meter, with an encoder, and a change in azimuth of the moving object 100 may be obtained by information about a steering angle from a rudder angle sensor.

The rotation matrix and the translation vector can be estimated by the image processing apparatus 110 using the taken images, for example. In this case, feature points are detected from the time-series images taken by the imaging device 101, and a flow in the time-series images can be obtained by associating the feature points with one another in the time-series images. The rotation matrix and the translation vector in the time-series images with respect to the coordinate system of the target surface 103 can be obtained from the flow.

Figure 3:
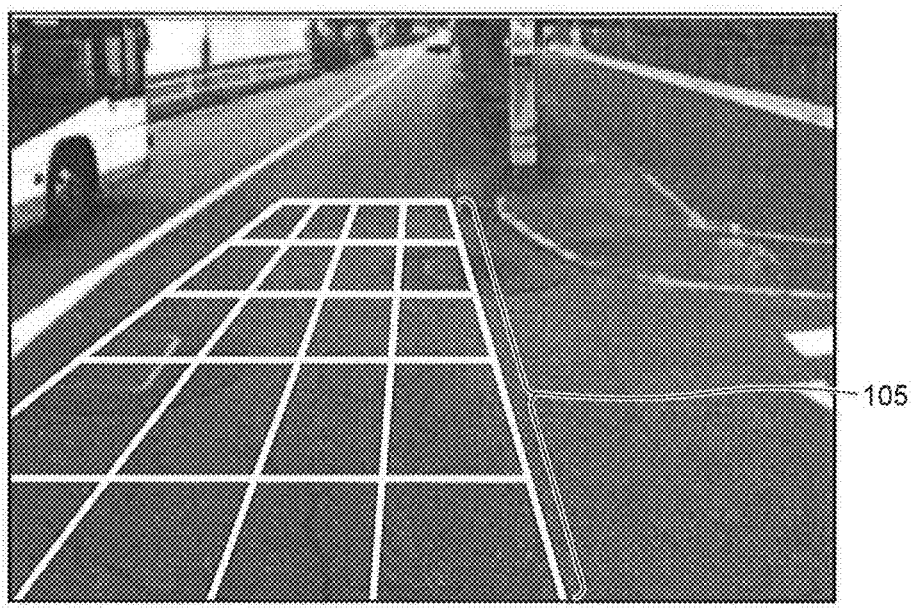
FIG. 3 is a schematic diagram illustrating an example of a taken image in the first embodiment.

FIG. 3 is a schematic diagram illustrating an example of an image taken by the imaging device 101 in the first embodiment. In the example illustrated in FIG. 3, an inspection range 105, which is composed of inspection areas used for crack inspection, is schematically illustrated. The inspection range 105 is not actually depicted on the target surface 103. In the first embodiment, as illustrated in FIG. 3, one or more inspection areas are imaged in the image without deficiency because the imaging device 101 has an angle of view capable of collectively imaging the inspection areas. In the first embodiment, the size of the inspection area is 50 cm×50 cm. The size is, however, not limited to the example.

Figure 4:
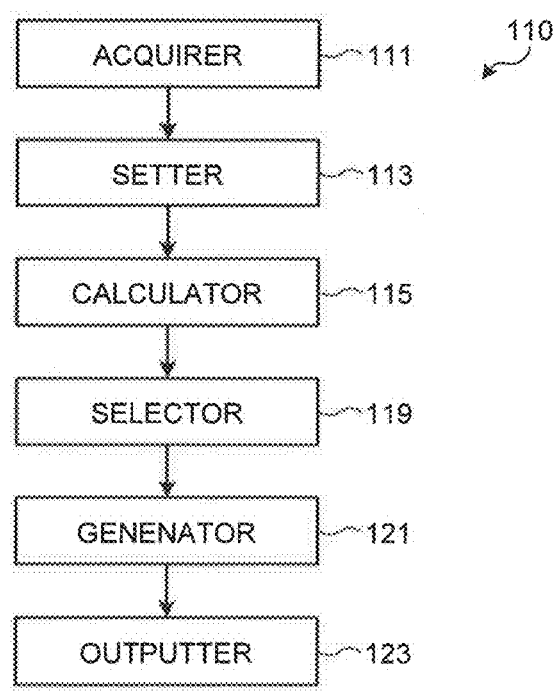
FIG. 4 is a schematic diagram illustrating an example of a structure of an image processing apparatus in the first embodiment.

FIG. 4 is a schematic diagram illustrating an example of a structure of the image processing apparatus 110 in the first embodiment. As illustrated in FIG. 4, the image processing apparatus 110 includes an acquirer 111, a setter 113, a calculator 115, a selector 119, a generator 121, and an outputter 123.

The acquirer 111, the setter 113, the calculator 115, the selector 119, the generator 121, and the outputter 123 may be implemented by causing a processing unit such as a central processing unit (CPU) to execute a program, i.e., implemented by software, by hardware such as an integrated circuit (IC), or by both of software and hardware.

The acquirer 111 acquires, from the imaging device 101, a plurality of taken images of the target surface 103 imaged by the imaging device 101 in time series while the imaging device 101 is moved by the moving object 100. The acquirer 111 also acquires the internal parameters from the imaging device 101, for example.

The setter 113 sets the inspection range composed of a plurality of inspection areas on the target surface 103. Specifically, the setter 113 virtually sets the inspection range on the target surface 103.

Figure 5:
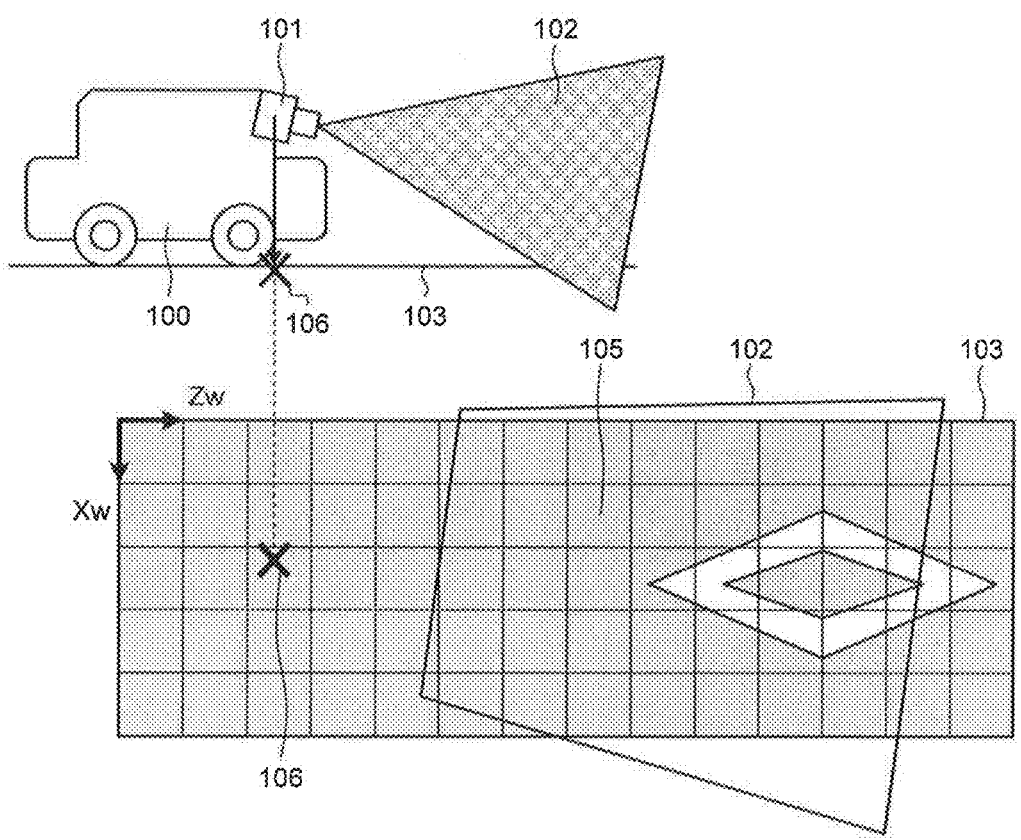
FIG. 5 is an explanatory view of a technique for setting an inspection range in the first embodiment.

FIG. 5 is an explanatory view illustrating an example of a method for setting the inspection range in the first embodiment. The upper diagram in FIG. 5 illustrates the coordinate system of the target surface 103 viewed from side. The lower diagram in FIG. 5 illustrates the coordinate system of the target surface 103 viewed from above. In the example illustrated in FIG. 5, the inspection range 105 composed of the multiple inspection areas is set all over the target surface 103. The diamond mark on the target surface 103 is an indicator indicating that a pedestrian crossing is present. A position 106 indicates the position of the imaging device 101 (specifically, the optical center of the imaging device 101).

The inspection range 105 is not set every time an image is taken. The inspection range 105 is a coordinate system that is fixed once it is set (herein, described as a world coordinate system w). The inspection range 105 may be a range necessary for inspection of the target surface 103. The width (the Xw axis) of the inspection range 105 may be set to a vehicle width, a lane width of a road, or a roadway width, for example. The Zw axis represents a running range of the moving object 100.

The calculator 115 calculates a corresponding relation between the coordinate system of the imaging device 101 and the coordinate system of the target surface 103.

Figure 6:
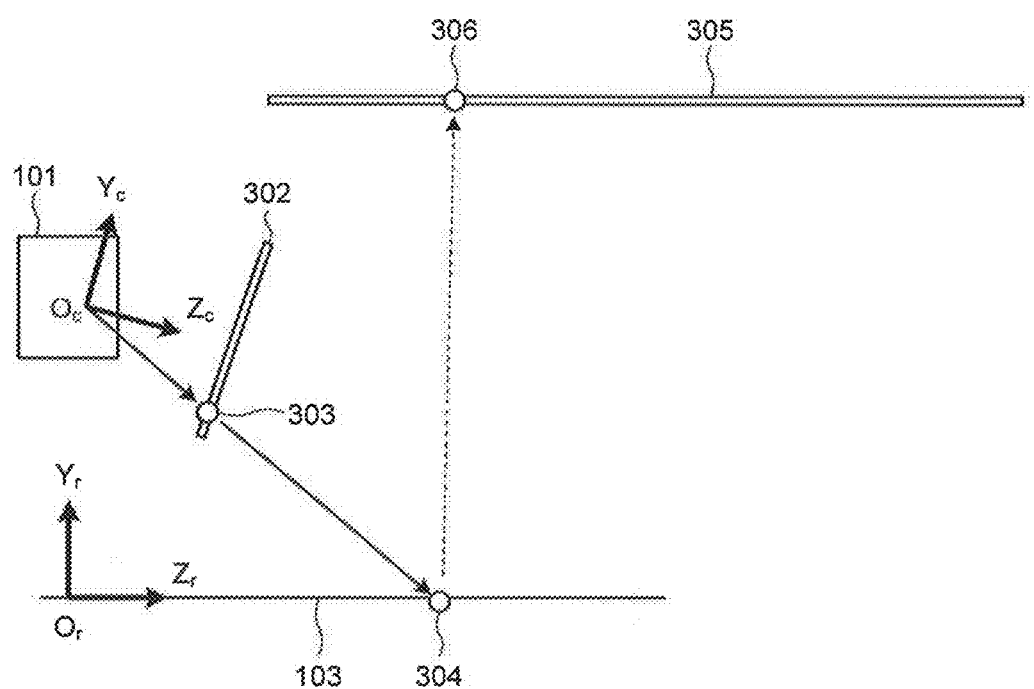
FIG. 6 is an explanatory view of an example of a corresponding relation in the first embodiment.

The coordinate system of the target surface 103 and the coordinate system on an ortho-image have a one-to-one relation. Specifically, as illustrated in FIG. 6, when a position 303 on an image plane 302 of the imaging device 101 corresponds to a point 304 on the target surface 103, the point 304 can be transformed into a point 306 on an ortho-image plane 305 parallel to the road surface.

Specifically, a relation between a two-dimensional position on the image plane 302 and a three-dimensional position on the target surface 103 is represented by expression (6).

$$\tilde{x}_{302} \sim A(I|0)\tilde{X}_{110} = A(R|-Rt)\tilde{X}_{111} \qquad (6)$$

where $\tilde{X}_{110}$ represents the three-dimensional position in the coordinate system of the imaging device 101 in a homogeneous coordinate system while $\tilde{X}_{111}$ represents the three-dimensional position in the coordinate system of the target surface 103 in a homogeneous coordinate system.

The calculator 115 obtains expression (6) as the corresponding relation between the coordinate system of the taken image and the coordinate system of the target surface 103. A pixel value of a position that is on the taken image and corresponds to any position on the target surface 103 is acquired using expression (6), and the acquired pixel value is mapped on the corresponding point on the ortho-image plane 305. As a result, an ortho-image of the taken image can be generated.

The target surface 103 is a plane in a three-dimensional space. The taken image of the target surface 103, thus, can be transformed into the ortho-image using a projection transform matrix. A homography matrix $H_0$ corresponding to the target surface 103 is present between the ortho-image plane 305 and the image plane 302 of the imaging device 101. Thus, the relation between a position on the ortho-image plane 305 and a position on the image plane 302 of the imaging device 101 is represented by expression (7) using the homography matrix $H_0$.

$$\tilde{x}_{305} \sim H_0 \tilde{x}_{302} = A_{305} R^{-1} A^{-1} \tilde{x}_{302} \qquad (7)$$

The calculator 115 may obtain expression (7) as the corresponding relation between the coordinate system of the taken image and the coordinate system of the target surface 103. When the ortho-image is generated from the taken image using expression (7), the corresponding relation between the ortho-image plane 305 and the image plane 302 of the imaging device 101 can be readily calculated, thereby making it possible to readily generate the ortho-image.

The homography matrix $H_0$ is composed of $A_{305}$, which represents internal camera parameters of a virtual camera that generates an ortho-image, a rotation matrix R between the coordinate system of the camera and the coordinate system of a structure, and A, which represents the internal camera parameters of the imaging device 101.

Any parameter can be set to $A_{305}$, which represents the internal camera parameters of the virtual camera. $A_{305}$, thus, can be represented by expression (8) where d is the distance from the virtual camera to the structure.

$$A_{305} = \begin{pmatrix} \alpha d & 0 & cx \\ 0 & \alpha d & cy \\ 0 & 0 & 1 \end{pmatrix} \qquad (8)$$

In expression (8), α is any parameter. The transformation is performed in such a manner that a distance of one meter corresponds to a size of α pixels on the ortho-image. In other words, one pixel corresponds to a distance of 1/α meter on an actual road surface. In expression (8), cx and cy represent the image center of the virtual camera that generates the ortho-image. As described above, any one of points (e.g., the point 304) in the coordinate system of the target surface corresponds to one point (e.g., the point 306) in the coordinate system on the ortho-image in a one-to-one manner.

The transformation from the taken image into the ortho-image is represented by the homography matrix $H_0$. The generation of the ortho-image and the coordinate transformation may be performed at a nigh speed using at least one of a preliminarily prepared table that performs coordinate transformation from the taken image into the ortho-image and a preliminarily prepared table that performs the coordinate transformation from the taken image to the ortho-image. Furthermore, a table may be prepared that performs coordinate transformation including correction of distortion in a lens.

Figure 7:
FIG. 7 is a schematic diagram illustrating an example of a taken image in the first embodiment.
Figure 8:
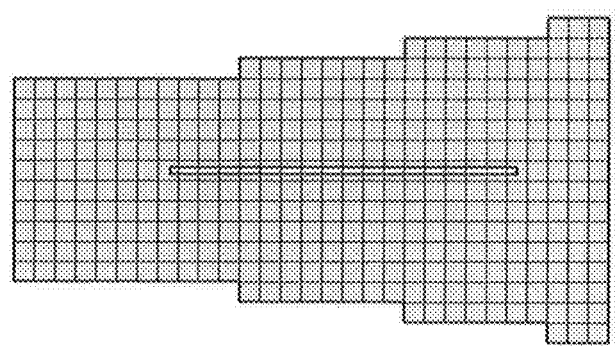
FIG. 8 is a schematic diagram illustrating an example of an ortho-image in the first embodiment.

FIG. 7 illustrates an example of the taken image imaged by the imaging device 101. FIG. 8 illustrates an example of the ortho-image of the taken image illustrated in FIG. 7.

The selector 119 selects, for each inspection area, a taken image used for generating an inspection area image out of the multiple taken images. The detail of the inspection area image is described later.

Specifically, the selector 119 identifies, for each taken image, the inspection area on the taken image on the basis of the position of the imaging device 101 at a time of taking the image in the coordinate system of the target surface 103 and on the basis of the corresponding relation calculated by the calculator 115.

First, the selector 119 obtains, for each of the taken images, an area corresponding to the inspection range in the coordinate system of the target surface 103.

Figure 9:
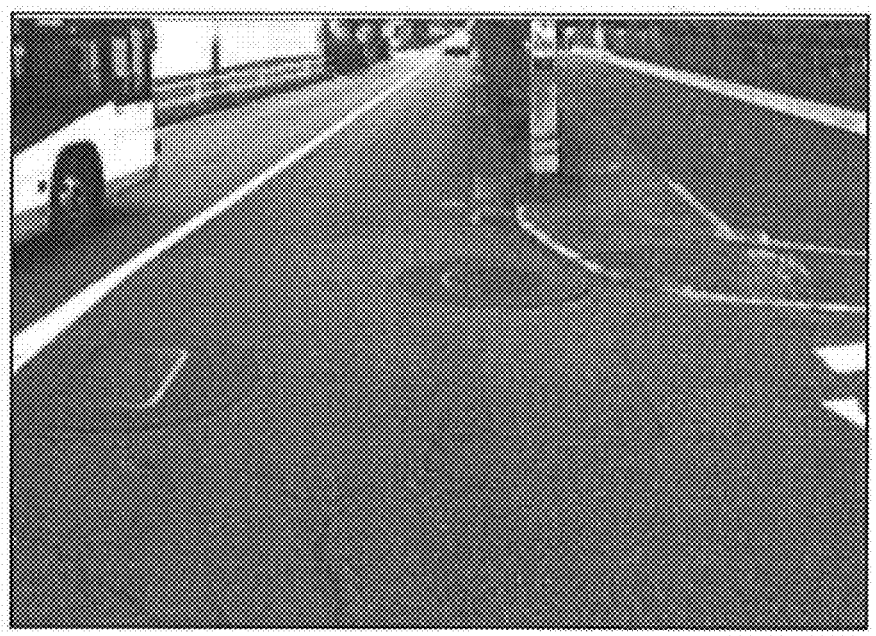
FIG. 9 is a schematic diagram illustrating another example of a taken image in the first embodiment.
Figure 10:
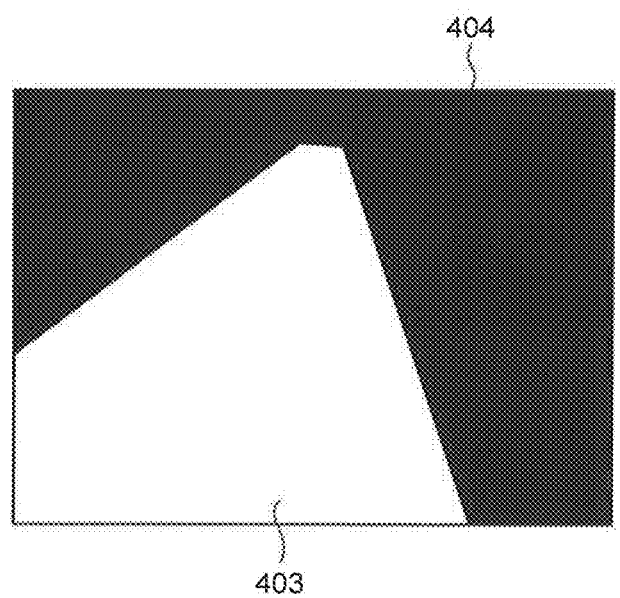
FIG. 10 is a schematic diagram illustrating an example of a mask image in the first embodiment.
Figure 11:
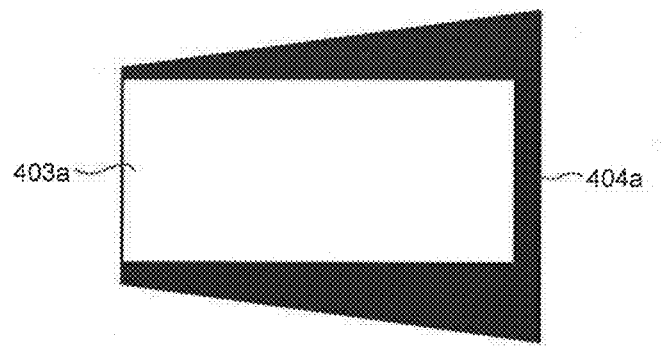
FIG. 11 is a schematic diagram illustrating another example of an ortho-image in the first embodiment.

For example, the selector 119 detects the lane from the taken image illustrated in FIG. 9, assigns different pixel values to the inside of the lane and the other area in the taken image, and generates a mask image in which an area 403 inside the lane and an area 404 in the other area are separated as illustrated in FIG. 10. The selector 119 then transforms the mask image into the ortho-image as illustrated in FIG. 11 using expression (6) or (7). As a result, an area 403a is obtained as the inspection range. The area 403a in FIG. 11 corresponds to the area 403 in FIG. 10 while an area 404a in FIG. 11 corresponds to the area 404 in FIG. 10.

Figure 12:
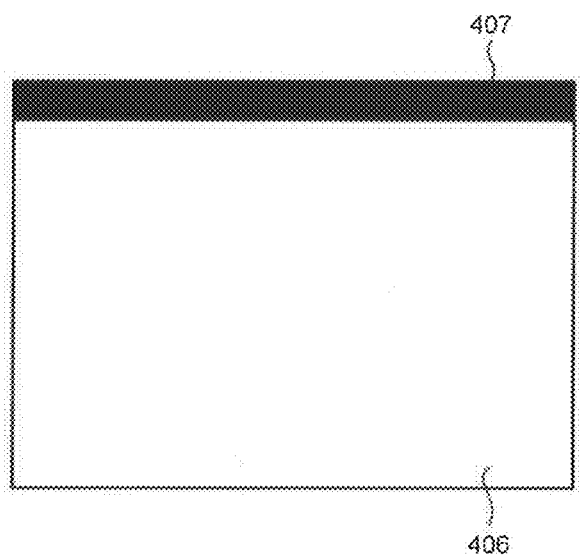
FIG. 12 is a schematic diagram illustrating another example of a mask image in the first embodiment.
Figure 13:
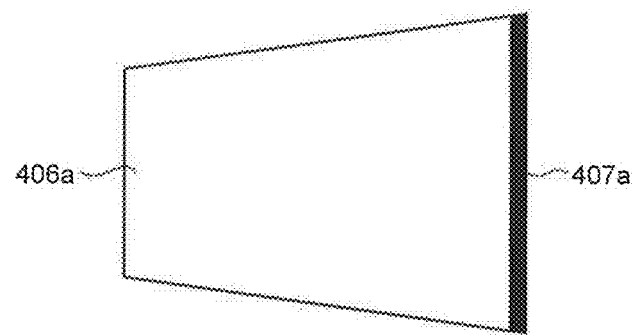
FIG. 13 is a schematic diagram illustrating another example of an ortho-image in the first embodiment.

For example, the selector 119 detects the horizontal line from the taken image illustrated in FIG. 9 using the posture of the imaging device 101 with respect to the target surface 103, assigns different pixel values to the lower side and the upper side of the horizontal line, and generates a mask image in which an area 406 on the lower side of the horizontal line and an area 407 on the upper side of the horizontal line are separated as illustrated in FIG. 12. The selector 119 then transforms the mask image into the ortho-image as illustrated in FIG. 13 using expression (6) or (7) As a result, an area 406a is obtained as the inspection range. The area 406a in FIG. 13 corresponds to the area 406 in FIG. 12 while an area 407a in FIG. 13 corresponds to the area 407 in FIG. 12.

Subsequently, the selector 129 obtains the position and the direction of an area corresponding to the obtained inspection range in the coordinate system of the target surface 103. Specifically, the selector 119 obtains the position of the imaging device 101 (particularly, the optical center of the imaging device 101) at the time of taking the image in the coordinate system of the target surface 103. For example, the selector 119 obtains the position of the imaging device 101 in the coordinate system of the target surface 103 using expression (9).

$$X_{r,m+1}=R_{r,m,n+1}X_{r,n}+t_{r,n,m+1}=R_{r,m,n+1}(R_{r,m-1,m}X_{r,m-1}+t_{r,m-1,m})+t_{r,m,m+1} \quad (9)$$

Expression (5) describes a relative movement between time m and time (m+1). As described in expression (9), the position at time (m+1) can be estimated using the movement at the time before the time m. Where a set time of the coordinate system of the inspection range 105 is zero, expression (9) is transformed into equation (10).

$$X_{r,m+1}=R_{r,m,m+1}(R_{r,m-1m}(R_{r,m-2,m-1}( \ldots X_{r,0})+i_{r,m-2,m-1})+t_{r,m-1,m})+t_{r,m,m+1} \quad (10)$$

The rotation matrix can be approximated by an identity matrix on the assumption that the taken images are not largely rotated among them.

In this way, the position and the direction of the area corresponding to the inspection area on the taken image in the coordinate system of the target surface 103 is obtained for each taken image. Consequently, the position and the direction of the inspection area on the taken image are obtained using expression (6) or (7), for each taken image.

The selector 119, then, selects the taken image, for each inspection area, on the basis of at least one of the shortness of the imaging distance to the inspection area, the size of the inspection area in the taken image, the degree to which a blur of the inspection area in the taken image is small, brightness of the inspection area in the taken image, and the degree to which noise in the inspection area in the taken image is small.

Figure 14:
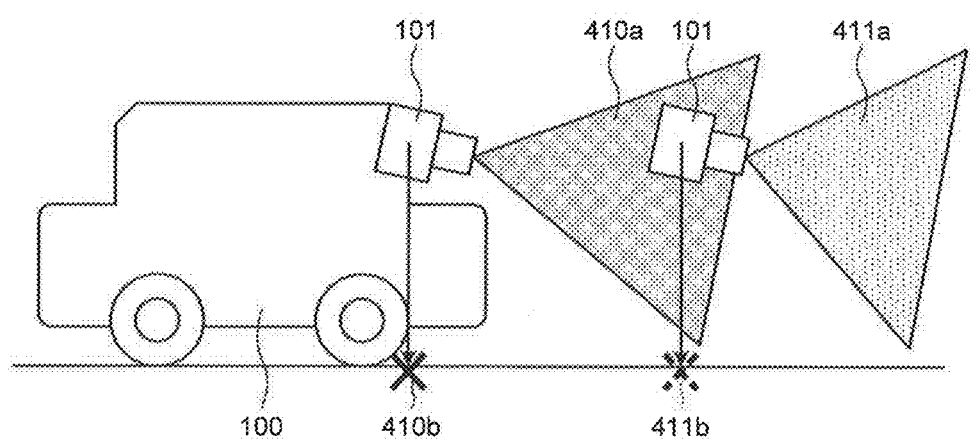
FIG. 14 is an explanatory view illustrating an example of a method for selecting the taken image in the first embodiment.
Figure 15:
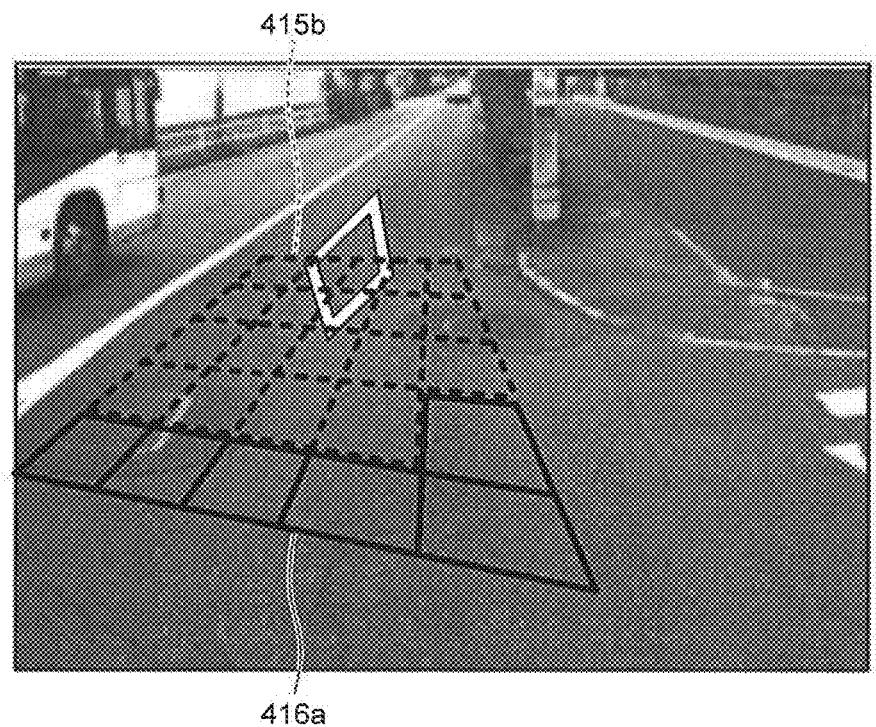
FIG. 15 is an explanatory view illustrating an example of a method for selecting the taken image in the first embodiment.
Figure 16:
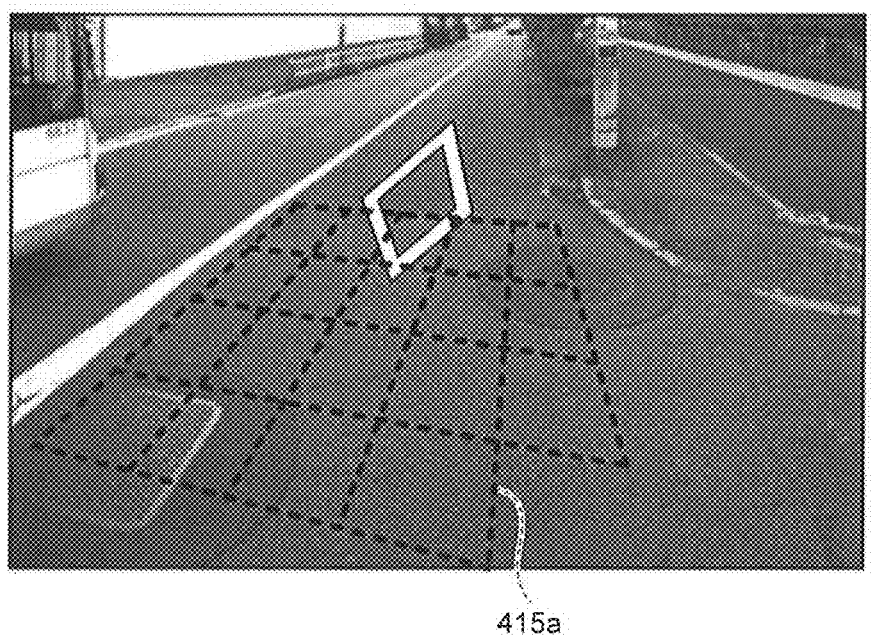
FIG. 16 is an explanatory view illustrating an example of a method for selecting the taken image in the first embodiment.
Figure 17:
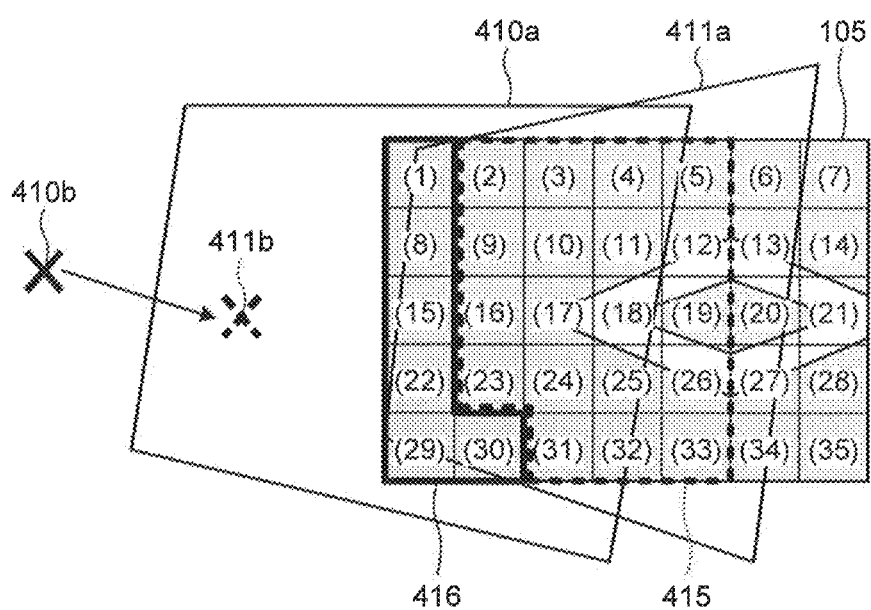
FIG. 17 is an explanatory view illustrating an example of a method for selecting the taken image in the first embodiment.

As illustrated in FIG. 14, the imaging device 101 takes the image illustrated in FIG. 15 in an imaging range 410a at a position 410b, and thereafter takes the image illustrated in FIG. 16 in an imaging range 411a at a position 411b, for example. FIG. 17 is a schematic diagram illustrating the position of the imaging device 101, the imaging range, and a relation among the multiple inspection areas in this case in the coordinate system of the target surface 103.

The following describes the method for selecting the taken image, for each inspection area, with reference to FIG. 17 as an example.

The selector 119 selects, for each inspection area, the image taken at the nearest position. This is because a pattern of the target surface 103 is largely captured in the image taken at the nearest position, thereby making it possible to observe finer patterns on the target surface 103. In this case, the selector 119 determines the image taken at the nearest position on the basis of the size of the inspection area in the taken image and the distance between the inspection area and the imaging device 101, for example.

As illustrated in FIG. 17, an inspection area 416 including areas (1), (8), (15), (22), (29), and (30) is imaged at the position 411b nearer than the position 410b, but the imaging range 411a covers only a part of the inspection area 416 and, thus, the whole of the inspection area 416 is not imaged. As for the inspection area 416 including areas (1), (8), (15), (22), (29), and (30), it is, thus, determined that the image illustrated in FIG. 15 is taken at the nearest position under the condition that the whole of the inspection area is imaged. As a result, the taken image illustrated in FIG. 15 is selected.

As illustrated in FIG. 17, the whole of an inspection area 415 including areas (2) to (5), (9) to (12), (16) to (19), (23) to (26), and (31) to (33) is imaged in both of the imaging ranges 410a and 411a. The image illustrated in FIG. 16 is, thus, taken at the nearest position. As a result, the taken image illustrated in FIG. 16 is selected.

In the taken image illustrated in FIG. 15, an area 415b corresponding to the inspection area 415 and an area 416a corresponding to the inspection area 416 are depicted. In the taken image illustrated in FIG. 16, an area 415a corresponding to the inspection area 415 is depicted. They are depicted for the purpose of making the positional relation of the inspection areas on the taken image easy to understand, and are not actually depicted.

Alternatively, the selector 119 may select, for each inspection area, the taken image having the best image quality. This is because a blur may occur in the taken image due to the movement of the moving object 100 when the image is taken too closely.

In this case, the taken image illustrated in FIG. 15 is selected for the inspection area 416 including areas (1), (8), (15), (22), (29), and (30) in the same manner as described above. As for the inspection area 415 including areas (2) to (5), (9) to (12), (16) to (1.9), (23) to (26), and (31) to (33), either one of the taker image illustrated in FIG. 15 and the taken image illustrated in FIG. 16 having better image quality is selected.

The taken image having better image quality is at least one of the taken image having a smaller blur, the taken image in which the inspection area is more brightly taken, and the taken image having less noise. For selecting the taken image having a smaller blur, a variance of pixel values in the area corresponding to the inspection area in the taken image is obtained, and the taken image may be selected that has a larger variance; or alternatively, frequency resolution is performed on the taken image, and the taken image including many high frequency components may be selected. As for the taken image in which the inspection area is more brightly taken, the taken image may be selected that has a larger average or a larger median of the pixel values in the area corresponding to the inspection area in the taken image. As for the taken image having less noise, the image may be selected that is taken by the imaging device 101 with a slower shutter speed or with a small gain, for example.

The selector 219 may select, for each inspection area, the taken image by combining the method that selects the image taken at the nearest position and the method that selects the taken image having the best image quality. In this case, a weight may be set for each method and select the taken image having a large score.

The generator 121 extracts, for each inspection area, from the taken image selected by the selector 119, a partial image corresponding to the inspection area on the basis of the position of the imaging device 101 at the time of taking the image in the coordinate system of the target surface 203, and the corresponding relation calculated by the calculator 115. The generator 121 transforms each of the partial images into a transformed partial image in the coordinate system of the target surface 103 on the basis of the corresponding relation. The generator 121 composes a plurality of transformed partial images on the basis of the arrangement of the multiple inspection areas to generate an inspection area image.

Figure 18:
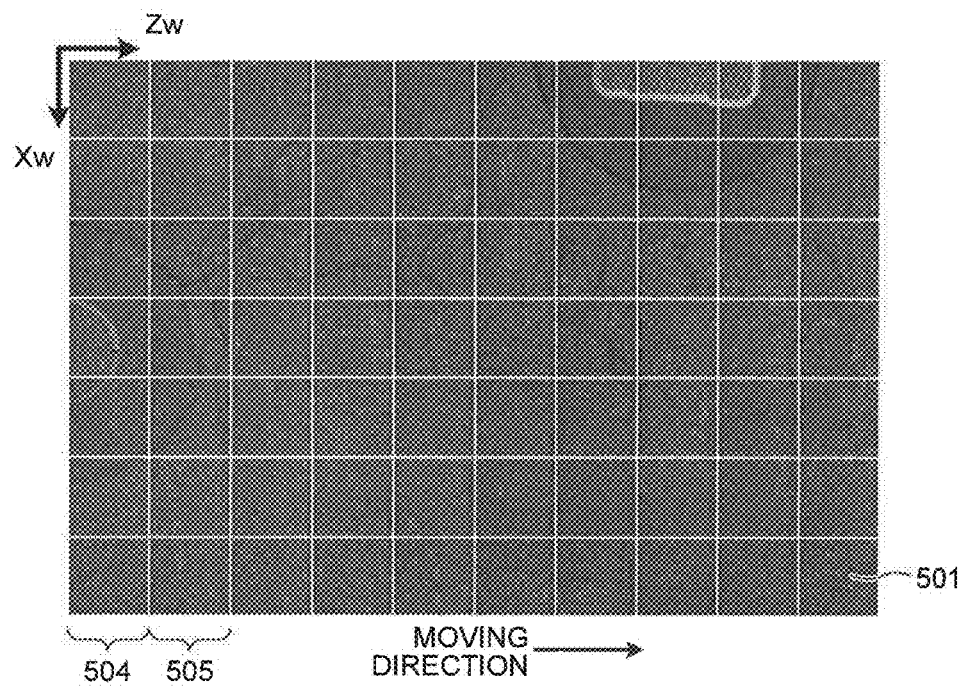
FIG. 18 is a schematic diagram illustrating an example of an inspection area image in the first embodiment.

FIG. 18 is a schematic diagram illustrating an example of an inspection area image. The inspection area image is the same as the image obtained by composing the images of the areas corresponding to the inspection areas in the ortho-images of the selected taken images. The inspection area image includes a plurality of inspection areas 501.

Figure 19:
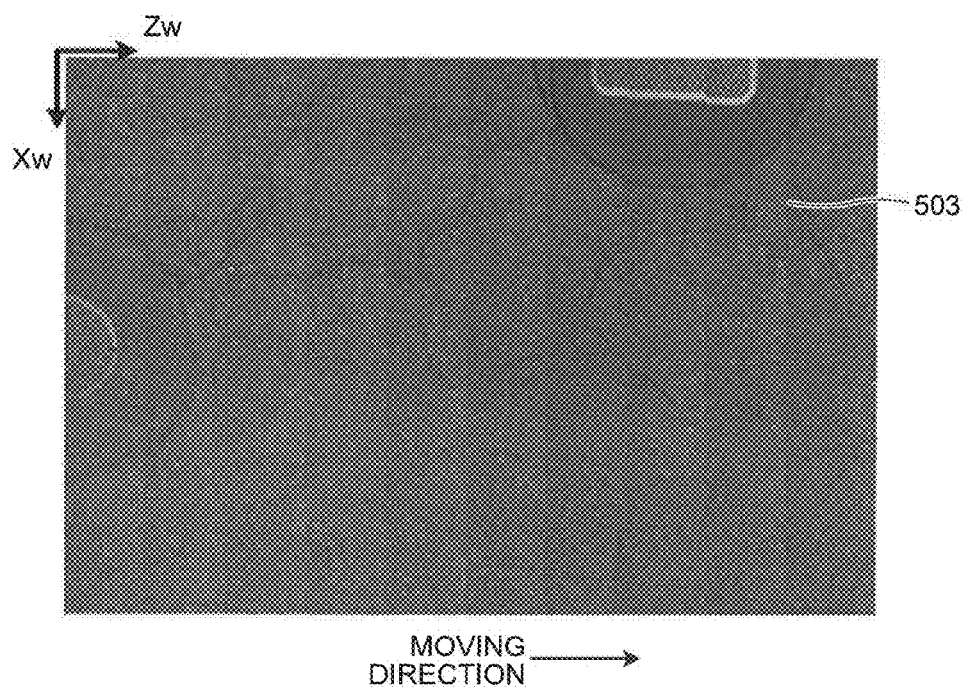
FIG. 19 is a schematic diagram illustrating another example of an inspection area image in the first embodiment.

In the inspection area image illustrated in FIG. 18, the inspection areas are partitioned with white lines so as to indicate the borders of the inspection areas 501. As illustrated in FIG. 19, the inspection areas may not be partitioned with white lines. In the inspection area image illustrated in FIG. 19, the border between the inspection areas can be found from the position denoted as 503, where the pixel value changes. This is because different taken images have different brightness.

For each taken image, the area that has been used for generating the inspection area image may be indicated. For example, in the taken image illustrated in FIG. 20, an area 504a is indicated that corresponds to a plurality of inspection areas 504 in the inspection area image illustrated in FIG. 18 while, in the taken image illustrated in FIG. 21, an area 505a is indicated that corresponds to a plurality of inspection areas 505 in the inspection area image illustrated in FIG. 18.

Figure 20:
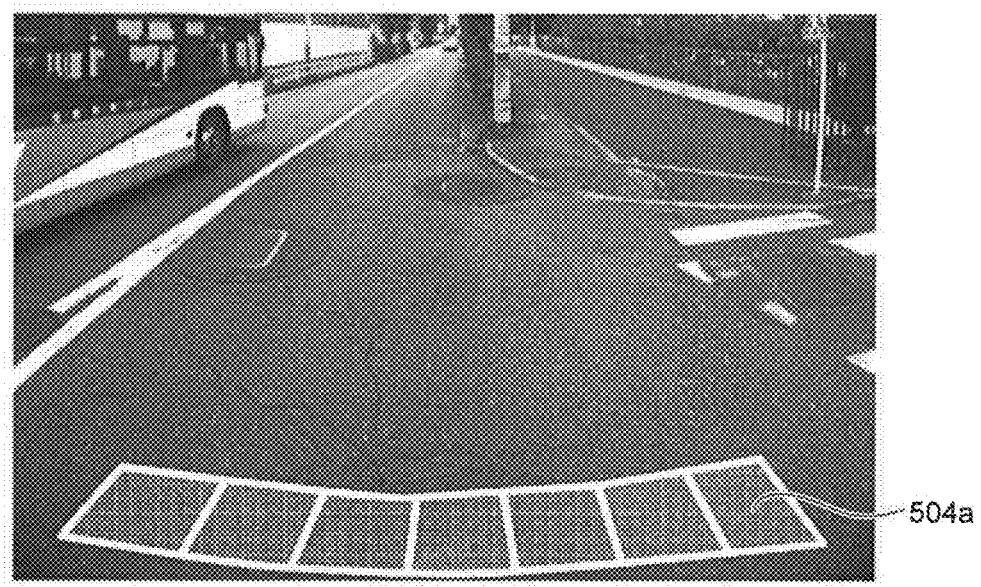
FIG. 20 is a schematic diagram illustrating an example of a taken image on which the inspection range is reflected in the first embodiment.
Figure 21:
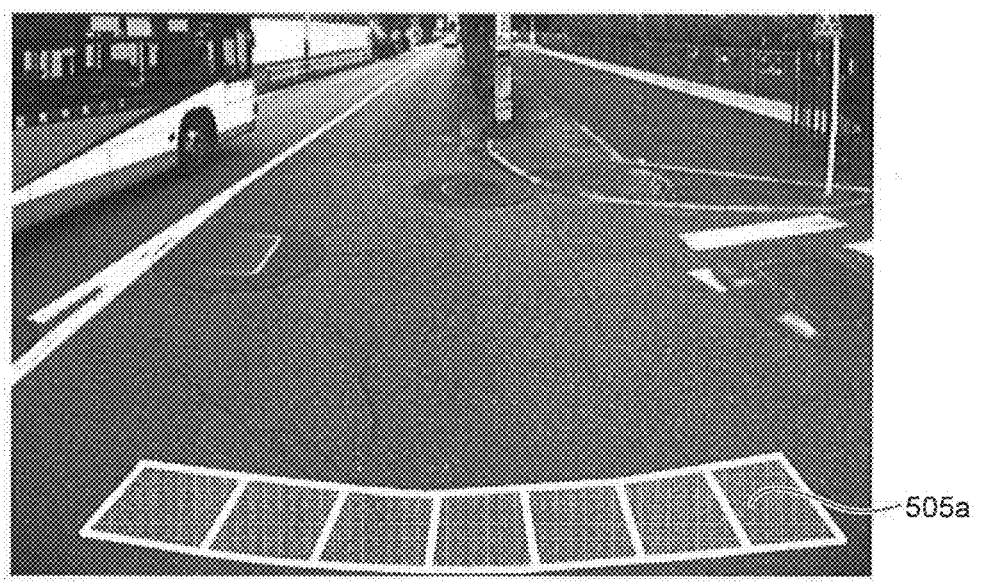
FIG. 21 is a schematic diagram illustrating another example of a taken image on which the inspection range is reflected in the first embodiment.

The areas 504a and 505s are distorted because the taken images illustrated in FIGS. 20 and 21 indicate the taken images in which lens distortion is not corrected. The area 504a in the taken image illustrated in FIG. 20 and the area 505a in the taken image illustrated in FIG. 21 may be obtained by matching the coordinates of the inspection area to the taken image using expression (10) and estimating the relation between the inspection area image and the taken image using expression (6) or (7).

The outputter 123 outputs the inspection area image generated by the generator 121. The inspection area image to be output may be any one of the inspection area image illustrated in FIG. 18 and the inspection area image illustrated in FIG. 19. When the inspection area image illustrated in FIG. 19 is output, coordinate information is preferably added to the output so that the location of the inspection area is apparent. The taken image illustrated in FIG. 20 or 21 may be output together with the inspection area image.

In the first embodiment, an inspector detects a defective part such as a crack in the inspection area using the output inspection area image, and uses the detection result as information for maintenance and management of a road pavement surface, which is the target surface 103.

Figure 22:
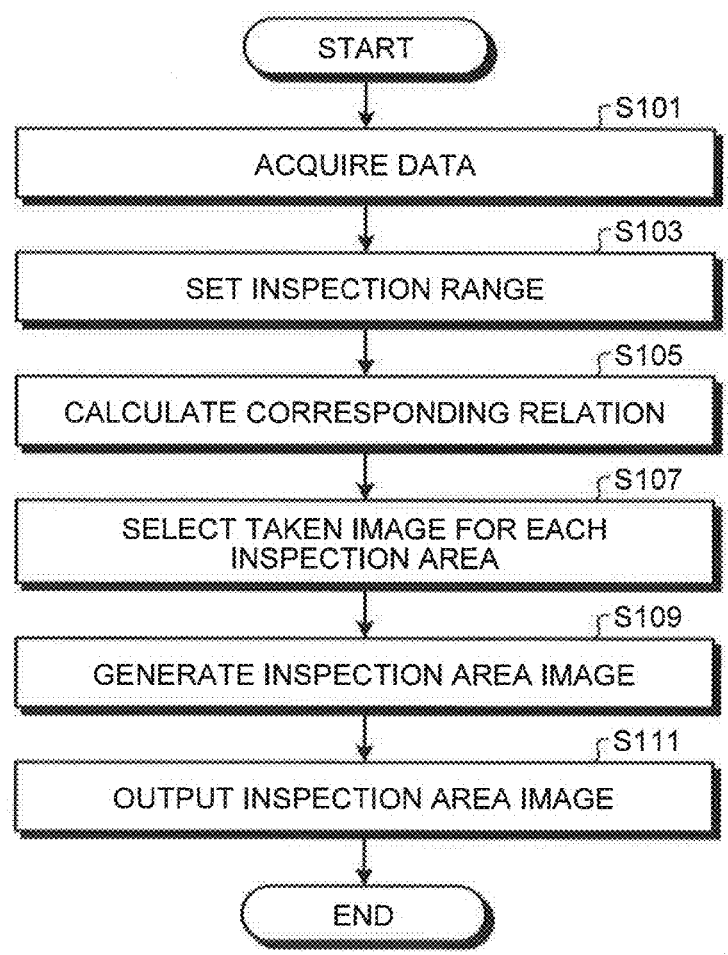
FIG. 22 is a flowchart illustrating exemplary processing in the first embodiment.

FIG. 22 is a flowchart illustrating an exemplary flow of a procedure of the processing in the first embodiment.

The acquirer 111 acquires various types of data such as a plurality of images of the target surface 103 imaged by the imaging device 101 in time series while the imaging device 101 is moved by the moving object 100, and the internal parameters (step S101).

The setter 113 sets the inspection range composed of a plurality of inspection areas on the target surface 103 step S103).

The calculator 115 calculates the corresponding relation between the coordinate system of the imaging device 101 and the coordinate system of the target surface 103 (step S105).

The selector 119 selects, for each inspection area, the taken image used for generating the inspection area image out of the multiple taken images (step S107).

The generator 121 extracts, for each inspection area, from the taken image selected by the selector 319, the partial image corresponding to the inspection area on the basis of the position of the imaging device 101 at the time of taking the image in the coordinate system of the target surface 103, and the corresponding relation calculated by the calculator 115. The generator 121 transforms each of the partial images into the transformed partial image in the coordinate system of the target surface 103 on the basis of the corresponding relation. The generator 121 composes a plurality of transformed partial images on the basis of the arrangement of the multiple inspection areas to generate the inspection area image (step S109).

The outputter 123 outputs the inspection area image generated by the generator 121 (step S111).

As described above, according to the first embodiment, the image of the inspection area in the inspection area image is selected from a single taken image, which causes a change in pixel value (uneven brightness) at the boundary between inspection areas. Such a change in pixel value, however, does not occur in the inspection areas. This configuration facilitates prevention of false detection of a crack in the inspection area without correcting a change in brightness between taken images.

The estimate values of the position and the posture of the moving object 100 may include an error in estimation. Such an error in estimation causes a crack to be divided or a plurality of cracks to overlap in some cases.

This inclusion of an error causes false inspection. In the embodiment, an error in estimation of the position and the posture occurs only in the border between inspection areas (e.g., the position denoted as 503), thereby not causing a problem of a divided crack or a plurality of cracks overlapping in the inspection area.

A road surface can be stably inspected even when the accuracy in estimation of the position and the posture of the moving object 100 is not high.

Second Embodiment

In a second embodiment, an example is described in which cracks are automatically detected. In the following description, differences from the first embodiment are mainly described. The same name and reference numeral of the first embodiment are given to the element having the same function, and description thereof is omitted.

Figure 23:
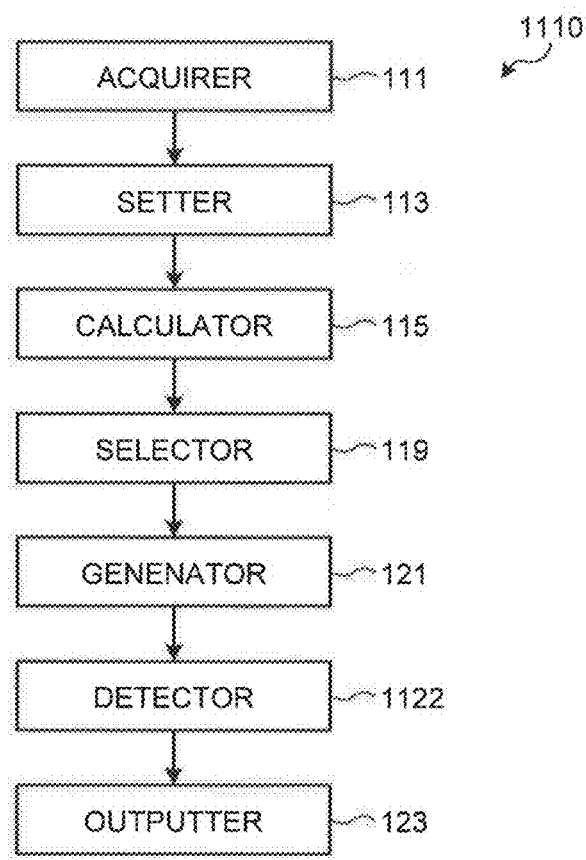
FIG. 23 is a schematic diagram illustrating an example of a structure of the image processing apparatus in a second embodiment.

FIG. 23 is a schematic diagram illustrating an example of a structure of an image processing apparatus 111*ii* in the second embodiment. As illustrated in FIG. 23, the image processing apparatus 1110 differs from the image processing apparatus in the first embodiment in that the image processing apparatus 3120 includes a detector 1122.

The detector 1122 detects, for each inspection area, a defective part such as a crack. For detecting a crack, pixel value information about the taken image is used. Specifically, a crack may be detected by filtering processing performed on the taken image so as to detect an edge because the crack is observed like a line shape in the taken image.

Alternatively, a crack may be detected in the following manner. A feature amount such as a luminance gradient histogram is calculated from a pattern of a crack. The pattern of a crack and a pattern of a non-crack are distinguished by learning using a support vector machine (SVM), a neural network, or a random forest, with the pattern of the non-crack, for example.

The image used for detecting a crack may be the inspection area image or the taken image. When the inspection area image is used for detecting a crack, it is preferable for detecting a finer crack to increase the value of $\alpha$ in expression (8) used for generating the ortho-image so as to increase resolution. It should be noted that resolution is not increased more than that of the taken image and the image becomes a blur when $\alpha$ is increased unnecessarily.

When the taken image is used for detecting a crack, the taken image is used without any change. The setting of $\alpha$ is, thus, unnecessary for detecting a crack.

Figure 24:
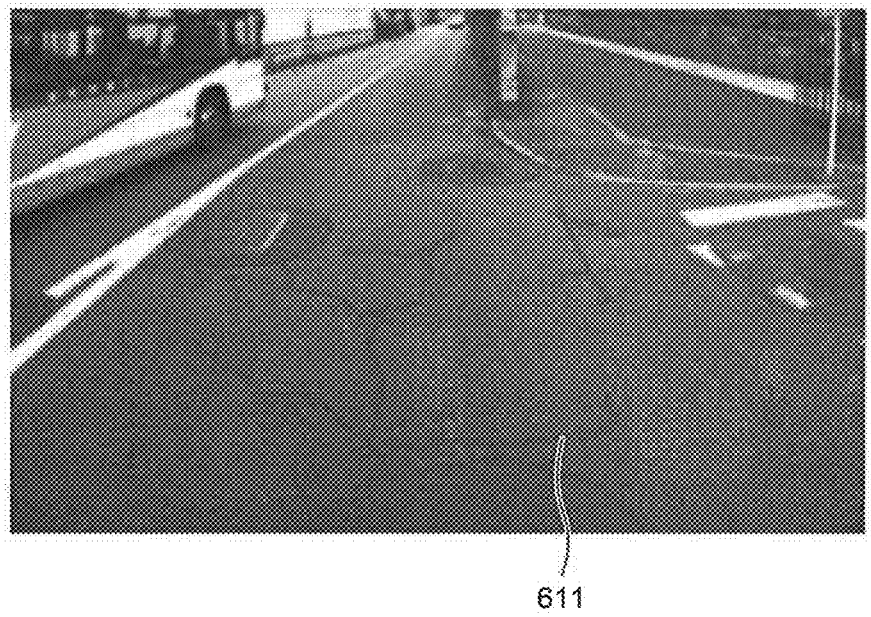
FIG. 24 is a schematic diagram illustrating an example of a crack detection result in the second embodiment.

The outputter 123 further outputs a detection result of a defective part such as a crack. As illustrated in FIG. 24, the outputter 123 may further output the taken image on which the crack detection result such as a crack occurrence part 611 is reflected, for example.

Figure 25:
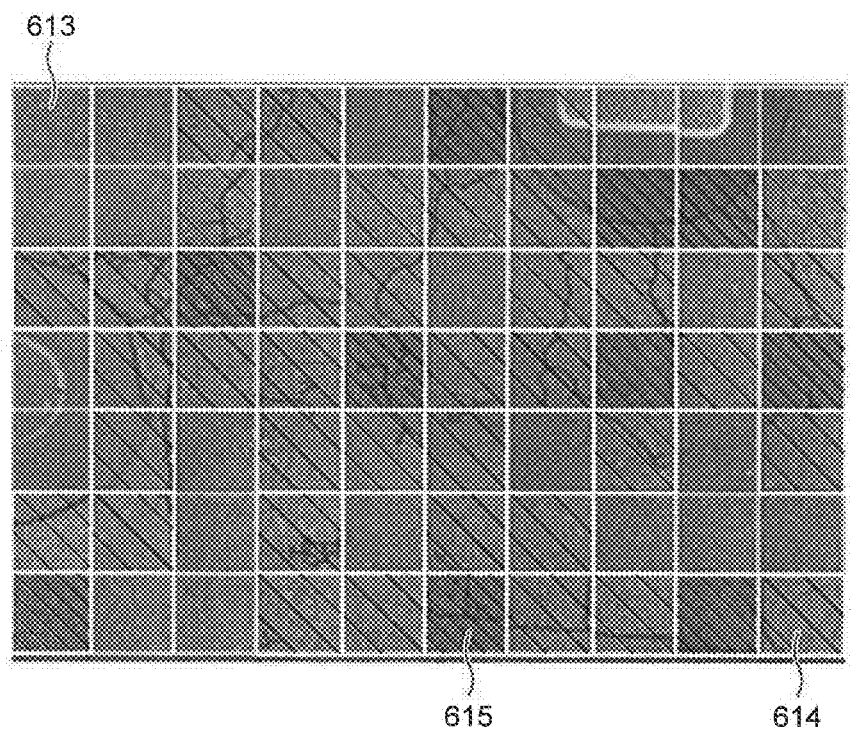
FIG. 25 is a schematic diagram illustrating another example of a crack detection result in the second embodiment.

As illustrated in FIG. 25, the outputter 123 may output the number of cracks by being visualized with color, for each inspection area on the inspection area image. In the example illustrated in FIG. 25, the number of cracks in an inspection area 613 is zero, the number of cracks in an inspection area 614 is one, and the number of cracks in an inspection area 615 is two or more.

A calculation of a crack percentage is specified in "Manual of pavement investigation and testing methods, S029, published by Japan Road Association, June in 2007", in which a large degree of crack is defined as a crack percentage of 100% while no crack is defined as a crack percentage of 0%. According to the manual, the number of cracks is zero is defined that an occupation area is zero, the number of cracks is one is defined that an occupation area is 0.1.5 $m^2$, and the number of cracks is two or more is defined that an occupation area is 0.25 $m^2$. The crack percentage is calculated by dividing an accumulative value of the areas according to the number of cracks by the area of an investigation area. The outputter 123 may output the crack percentage, which is obtained by the manner described above, of a road together with the inspection area image. The outputter 123 may output a length of a crack.

Figure 26:
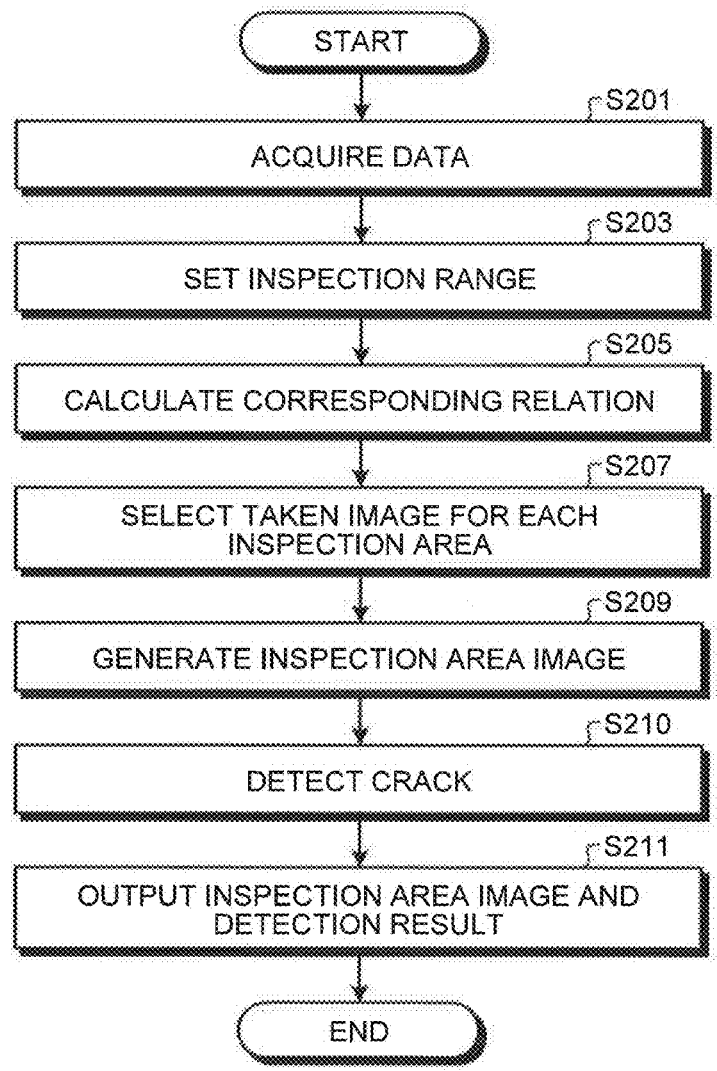
FIG. 26 is a flowchart illustrating exemplary processing in the second embodiment.

FIG. 26 is a flowchart illustrating an exemplary flow of a procedure of the processing in the second embodiment.

The processing from step S201 to step S209 is the same as that from step S101 to step S109 of the flowchart illustrated in FIG. 22.

At step S210, the detector 1122 detects a crack for each inspection area (step S210).

The outputter 123 outputs the inspection area image generated by the generator 121 and the crack detection result (step S211).

Modifications

In the embodiments, the target surface 103 is a road pavement surface. The target surface 103 is, however, not limited to the road pavement surface. The target surface 103 may be a concrete surface of a structure such as a bridge, a building, a tunnel, and cracks on the concrete surface and abnormality may be detected, for example. In this case, the moving object 100 may use a robot provided with a camera, or a swing camera.

The target surface 103 may be an elevator shaft and the moving object may be an elevator. Cracks or abnormality in the elevator shaft may be detected.

As described above, the target surface can be any surface that is capable of being imaged by the imaging device while the moving object moves relative to the surface. The moving object is not required to directly move on the target surface.

Hardware Structure

Figure 27:
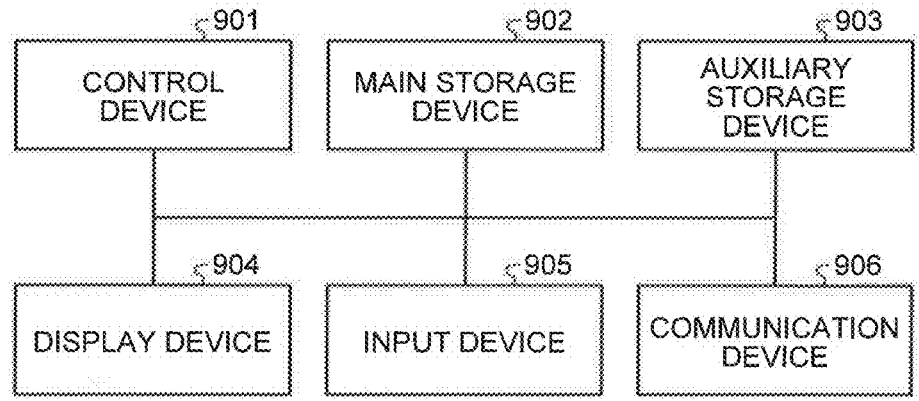
FIG. 27 is a schematic diagram illustrating an example of a hardware structure of the image processing apparatuses in the embodiments.

FIG. 27 is a schematic diagram illustrating an example of a hardware structure of the image processing apparatuses in the embodiments. As illustrated in FIG. 27, the image processing apparatuses according to the embodiments each have a hardware configuration utilizing a normal computer. Specifically, the image processing apparatus includes a control device 901 such as a CPU, a main storage device 902 such as a ROM or a RAM, an auxiliary storage device 903 such as an HDD or an SSD, a display device 904 such as a display, an input device 905 such as a keyboard or a mouse, and a communication device 906 such as a communication interface.

The programs executed by the image processing apparatuses according to the embodiments are stored and provided in a computer-readable storage medium such as a compact disc read only memory (CD-ROM), a compact disc recordable (CD-R), a memory card, a digital versatile disc (DVD), or a flexible disk (FD), as an installable or executable file.

The programs executed by the image processing apparatuses according to the embodiments may be stored in a computer connected to a network such as the Internet and provided by being downloaded via the network. Furthermore, the programs executed by the image processing apparatuses according to the embodiments may be provided or distributed via a network such as the Internet. The programs executed by the image processing apparatuses according to the embodiments may be embedded and provided in a ROM, for example.

The programs executed by the image processing apparatuses according to the embodiments each have a module structure that implements each of the units described above in a computer. In practical hardware, the CPU reads out the programs from the HDD to the RAM so as to execute the programs, so that the units described above can be implemented in the computer. When at least a part of the units is achieved by hardware such as an IC, the devices according to the embodiments may each further include the IC.

For example, the steps in the flowcharts of the embodiments may be changed in execution order, some steps may be executed simultaneously, or the steps may be executed in different order among implementations without departing from their roles.

The embodiments can reduce a possibility of the border between the images in the composed image being erroneously recognized as abnormality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
    an imaging device configured to capture a plurality of images of a target surface in time series while the imaging device is moved by a moving object and obtain the plurality of captured images of the target surface; and
    processing circuitry configured to:
        set an inspection range which is composed of inspection areas of a predetermined square measure, based on a coordinate system of the target surface, for each of the captured images of the target surface;
        select, for each of the inspection areas, a captured image of the target surface from among the plurality of captured images of the target surface based on a score of a captured image of the target surface, wherein the score is based on a weight applied to a method that selects an image taken at a nearest position to the inspection area and a weight applied to a method that selects an image having the best image quality;
        extract, for each of the inspection areas, from the selected captured image of the target surface, a partial image, based on a position of the imaging device at a time of capturing the selected image in the coordinate system of the target surface and based on a corresponding relation between a coordinate system of the imaging device and the coordinate system of the target surface;
        transform each of the partial images into a transformed partial image in the coordinate system of the target surface based on the corresponding relation; and
        compose a plurality of transformed partial images based on an arrangement of the inspection areas to generate the inspection area image; and
        output the inspection area image.

2. The apparatus according to claim 1, wherein the processing circuitry identifies, for each of the captured images of the target surface, the inspection area on each of the captured images based on the position of the imaging device at a time of capturing the image in the coordinate system of the target surface, and the corresponding relation.

3. The apparatus according to claim 1, wherein the processing circuitry is further configured to calculate the corresponding relation.

4. The apparatus according to claim 1, wherein the processing circuitry is further configured to detect a defective part from the inspection area image or from the inspection area on each of the captured images of the target surface and output a detection result.

5. The apparatus according to claim 1, wherein the target surface is a surface capable of being imaged by the imaging device while the imaging device moves relative to the surface.

6. The apparatus according to claim 1, wherein the imaging device has an angle of view capable of collectively imaging the inspection areas.

7. An image processing method, comprising:
    capturing, by an imaging device, a plurality of images of a target surface in time series while the imaging device is moved by a moving object and obtaining the plurality of captured images of the target surface;
    setting an inspection range which is composed of inspection areas of a predetermined square measure, based on a coordinate system of the target surface, for each of the captured images of the target surface;
    selecting, for each of the inspection areas, a captured image of the target surface from among the plurality of captured images of the target surface based on a score of a captured image of the target surface, wherein the score is based on a weight applied to a method that selects an image taken at a nearest position to the inspection area and a weight applied to a method that selects an image having the best image quality;
    extracting, for each of the inspection areas, from the selected captured image of the target surface, a partial image based on a position of the imaging device at a time of capturing the selected image in the coordinate system of the target surface and based on a corresponding relation between a coordinate system of the imaging device and the coordinate system of the target surface;
    transforming each of the partial images into a transformed partial image in the coordinate system of the target surface based on the corresponding relation;
    composing a plurality of transformed partial images based on an arrangement of the inspection areas to generate the inspection area image; and
    outputting the inspection area image.

8. A computer program product comprising a non-transitory computer-readable medium containing programmed instructions, the instructions causing a computer to execute:

capturing, by an imaging device, a plurality of images of a target in time series while the imaging device is moved by a moving object and obtaining the plurality of captured images of the target surface;

setting an inspection range which is composed of inspection areas of a predetermined square measure, based on a coordinate system of the target surface, for each of the captured images of the target surface;

selecting, for each of the inspection areas, a captured image of the target surface from among the plurality of captured images of the target surface based on a score of a captured image of the target surface, wherein the score is based on a weight applied to a method that selects an image taken at a nearest position to the inspection area and a weight applied to a method that selects an image having the best image quality;

extracting, for each of the inspection areas, from the selected captured image of the target surface, a partial image based on a position of the imaging device at a time of capturing the selected image in the coordinate system of the target surface and based on a corresponding relation between a coordinate system of the imaging device and the coordinate system of the target surface;

transforming each of the partial images into a transformed partial image in the coordinate system of the target surface based on the corresponding relation;

composing a plurality of transformed partial images based on an arrangement of the inspection areas to generate the inspection area image; and outputting the inspection area image.

* * * * *